United States Patent
Yu et al.

(10) Patent No.: US 8,044,747 B2
(45) Date of Patent: Oct. 25, 2011

(54) CAPACITOR COUPLED ETHERNET

(75) Inventors: James Yu, San Francisco, CA (US); Minh Tran, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 216 days.

(21) Appl. No.: 12/433,080

(22) Filed: Apr. 30, 2009

(65) Prior Publication Data

US 2010/0277293 A1    Nov. 4, 2010

(51) Int. Cl.
*H03H 2/00* (2006.01)
*H04B 3/00* (2006.01)

(52) U.S. Cl. .................................. 333/24 R; 375/257

(58) Field of Classification Search ................. 333/24 R; 370/254; 375/222, 257, 258
See application file for complete search history.

(56) References Cited

U.S. PATENT DOCUMENTS 7,190,716 B2*  3/2007  Norrell et al. ................. 375/222
7,656,956 B2*  2/2010  King ............................ 375/257

* cited by examiner

*Primary Examiner* — Dean Takaoka
(74) *Attorney, Agent, or Firm* — Duane S. Kobayashi

(57) ABSTRACT

A system and method for enabling power applications over a single conductor pair. In one embodiment, data transformers are coupled to a single conductor pair using one or more direct current (DC) blocking elements that preserve an alternating current path. Power is injected onto the single conductor pair after the DC blocking elements and power is extracted from the single conductor pair before the DC blocking elements. Saturation of the data transformers by the injection of power onto the single pair is thereby prevented.

16 Claims, 5 Drawing Sheets

US 8,044,747 B2

CAPACITOR COUPLED ETHERNET

BACKGROUND

Field of the Invention

The present invention relates generally to Ethernet systems and method and, more particularly, to capacitor coupled Ethernet.

Introduction

Power over Ethernet (PoE) (also known as inline power and phantom power) specifications such as IEEE 802.3af (PoE) and 802.3at (PoE Plus) provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

Conventionally, the PoE and PoE Plus specifications are designed to work on two-pair cabling using a pair of transformers in the PSE and the PD. PoE is capable of running over a worst case of 100 m on two pairs of Category 3 cabling and PoE Plus is capable of running on a worst case of 100 m on two pairs of Category 5 cabling. Implementations of PoE and PoE Plus include multiple instantiations, for example, over all four pairs. Non-standard four-pair as well as two-pair implementations also exist.

Current specifications do not address certain applications such as those that exist in older buildings that contain one-pair wiring. What is needed therefore is a mechanism that enables the transmission of high-speed data and power over one-pair wiring using a single transformer near the PSE and the PD.

SUMMARY

A capacitor coupled Ethernet, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
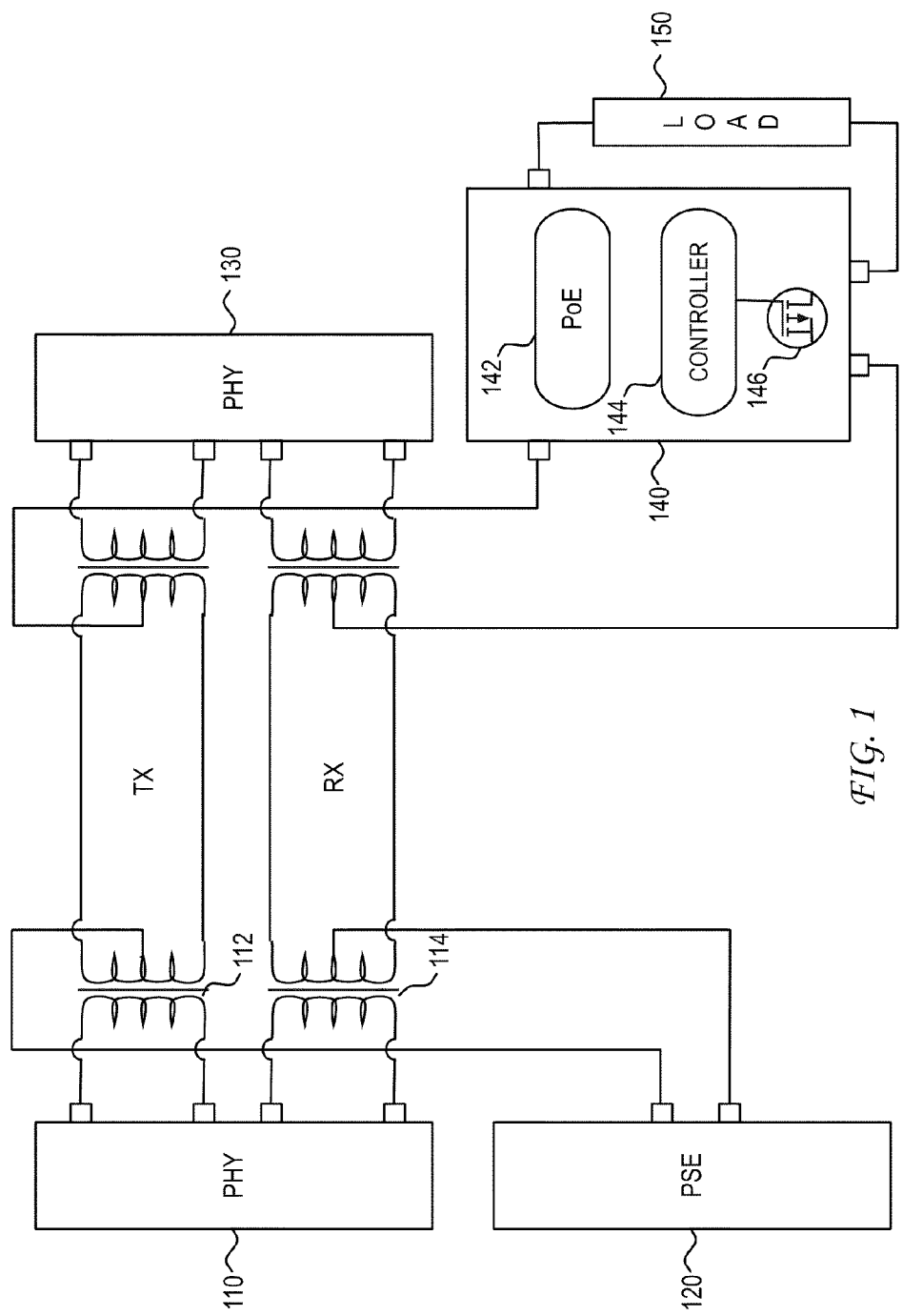
FIG. 1 illustrates an embodiment of a two-pair PoE system.

FIG. 1 illustrates an example of a conventional PoE system. As illustrated, the PoE system includes PSE 120 that transmits power to powered device (PD) 140 over two wire pairs. Power delivered by PSE 120 to PD 140 is provided through the application of a voltage across the center taps of a first transformer 112 that is coupled to a transmit (TX) wire pair and a second transformer 114 that is coupled to a receive (RX) wire pair carried within an Ethernet cable.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3at (PoE Plus), legacy PoE transmission, or any other type of PoE transmission. PD 140 also includes controller 144 (e.g., pulse width modulation DC:DC controller) that controls power transistor (e.g., FET or bipolar) 146, which in turn provides constant power to load 150.

Figure 2:
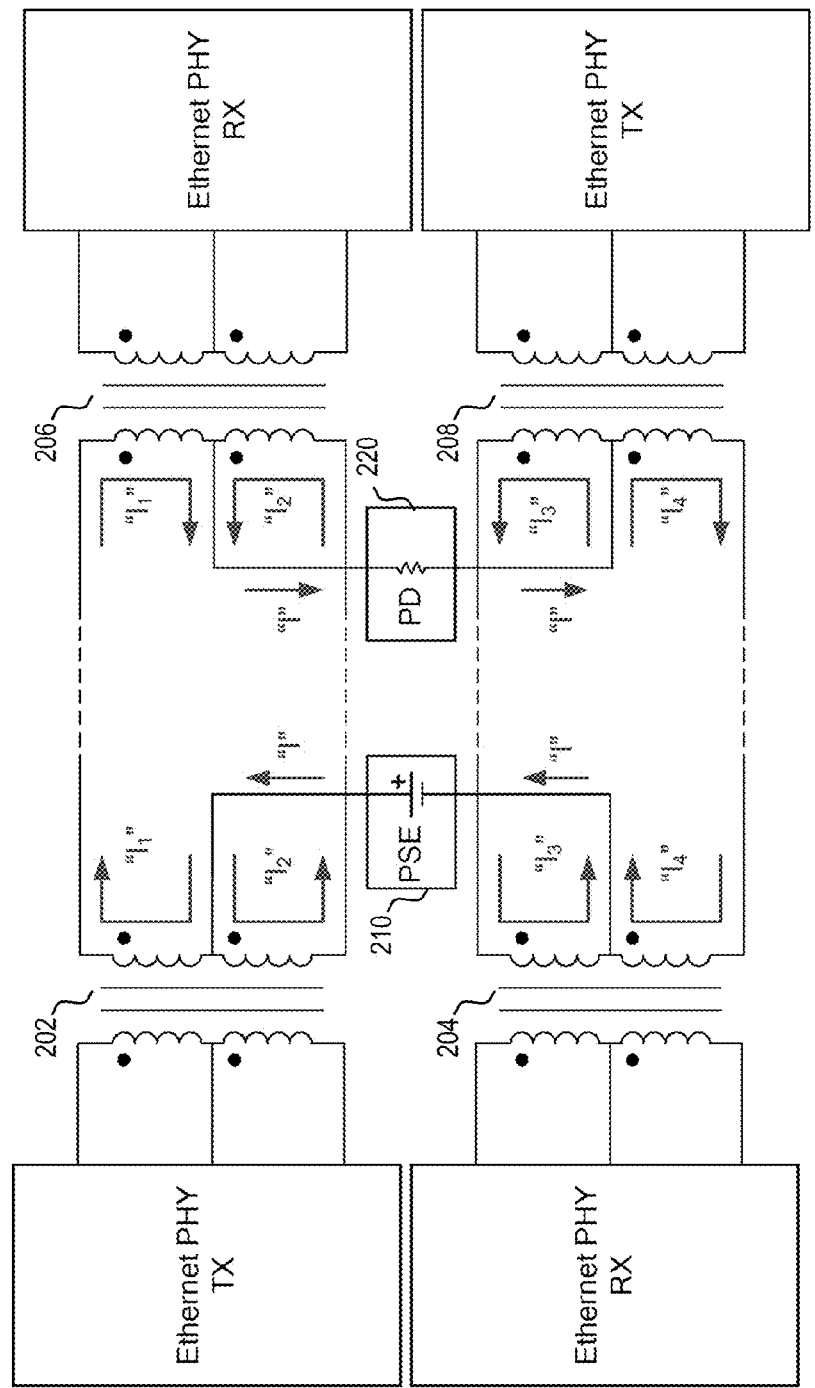
FIG. 2 illustrates an operation of a two-pair PoE system.

FIG. 2 illustrates an operation of a two-pair PoE system. As illustrated, power is injected by PSE DC power supply 210 at the center taps of data transformers 202 and 204 on the PSE side and extracted by PD 220 from the center taps of data transformers 206 and 208 on the PD side. In this illustration, the current "I" is the PoE current. This PoE current "I" gets split into $I_1$ and $I_2$ at the positive path on the TX wire pair and into $I_3$ and $I_4$ at the negative path on the RX wire pair such that $I=I_1+I_2=I_3+I_4$.

On each of the four data transformers 202, 204, 206, 208, the DC current does not cause core saturation since the currents flowing through the center taps of transformers 202, 204, 206, 208 are canceling each other. In other words, currents $I_1$ and $I_2$ are flowing in and out of the winding points of transformers 202, 206, hence canceling each other. The same is true for currents $I_3$ and $I_4$, which are flowing in and out of the winding points of transformers 204, 208, hence canceling each other.

Here, it should be noted that if there is a current imbalance between the currents $I_1$ and $I_2$ or $I_3$ and $I_4$, then the transformer core can be saturated if the imbalance current exceeds the core saturation current. In various examples, this current imbalance can be produced through a difference in resistance between the two paths, mismatch in the transformer windings on each side, connectors, etc. Any mismatch can cause a difference in current to flow in one path versus the other. If the difference is small, then the transformer wouldn't saturate. If the difference is large, however, then the transformer will saturate. Saturation will impact the data behavior of the link as the transformer will no longer function properly. In general, the longer the cable the less the impact of the mismatch as it is a percentage of the overall resistance.

Conventional PoE specifications have been designed to work on two-pair cabling using a pair of transformers such as that illustrated in FIG. 2. As noted, however, a significant number of installations contain one-pair wiring. Accordingly, a new PoE mechanism that enables the transmission of data and power over one-pair wiring is needed to address these potential markets.

For one-pair installations, only a single transformer is used at the PSE and the PD. The problem with using a single transformer is that the transformer will saturate quickly. This results due to the absolute current that flows through the single transformer as opposed to the current that results from the differential mismatch when two transformers are used in a two-pair installation.

These problems can be addressed by using larger transformer cores. Larger transformer cores are expensive, however, and do not scale well with current. The larger transformer also gets hot and does not accommodate the typical space limitations presented by PSE/PD systems. More importantly, the larger transformer cores do not provide the required frequency response and other requirements needed to accommodate high-speed data transmission.

In general, one-pair installations would require a custom data transformer that would be very large in size to avoid saturating. The additional costs imposed by such transformer modifications present significant obstacles in the drive to introduce a cost-effective solution into the market.

Figure 3:
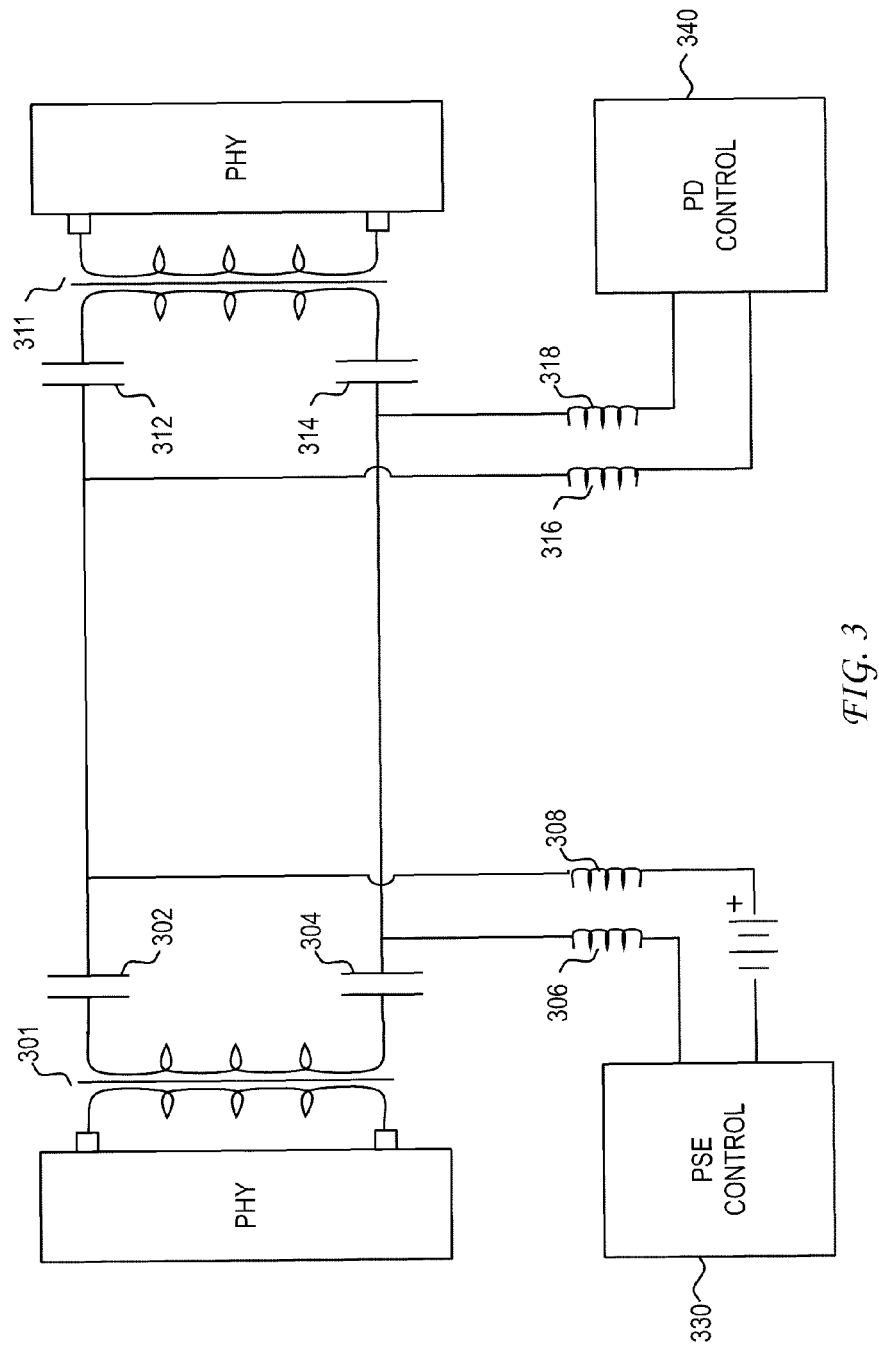
FIG. 3 illustrates an example of a single-pair PoE system according to the present invention.

It is a feature of the present invention that PoE can be enabled in one-pair installations without requiring custom/over-sized data transformers. FIG. 3 illustrates an embodiment of such a system that uses a single conventional data transformer at both the PSE and PD.

In accordance with the present invention, data transformers 301 and 311 are coupled to the single pair using a set of DC blocking elements that preserve an alternating current (AC) path. More specifically, data transformer 301 on the PSE side is coupled to the single pair using blocking capacitors 302, 304. Similarly, data transformer 311 on the PD side is coupled to the single pair using blocking capacitors 312, 314. In one example, capacitors 302, 304, 312, 314 can be embodied as 0.1 μF/100V capacitors.

As illustrated, power is injected onto the single pair by PSE control 330 after blocking capacitors 302, 304. Similarly, power is extracted from the single pair by PD control 340 before blocking capacitors 312, 314. In this arrangement, capacitors 302, 304 on the PSE side and capacitors 312, 314 on the PD side are designed to block or otherwise prevent DC current from flowing into the data transformers. Saturation of the data transformers by the injection of power onto the single pair is thereby prevented. Significantly, capacitors 302, 304 on the PSE side and capacitors 312, 314 on the PD side do not impact the data transmission between the PHYs as AC current passes through capacitors 302, 304, 312, 314.

Both PSE control 330 and PD control 340 are coupled to the single pair via a set of AC blocking elements that preserve a DC path. More specifically, PSE control 330 is coupled to the single pair using inductors 306, 308. Similarly, PD control 340 is coupled to the single pair using inductors 316, 318, respectively. In one example, inductors 306, 308, 316, 318 can be embodied as 100 μH/600 mA inductors.

Inductors 306, 308 on the PSE side and inductors 316, 318 on the PD side are designed to block or otherwise prevent AC current from flowing into the PSE and PD elements, respectively. A negative impact on the data transmission between the PHYs is thereby removed. Inductors 306, 308 on the PSE side and inductors 316, 318 on the PD side are designed to pass DC current, which is used in the transmission of power from the PSE to the PD.

With this framework, the present invention enables power to be delivered over a single pair without the risks of saturation of the transformer core. Significantly, the addition of DC blocking elements can be applied to any data transformer in enabling a single pair to provide power from a PSE to a PD.

Figure 4:
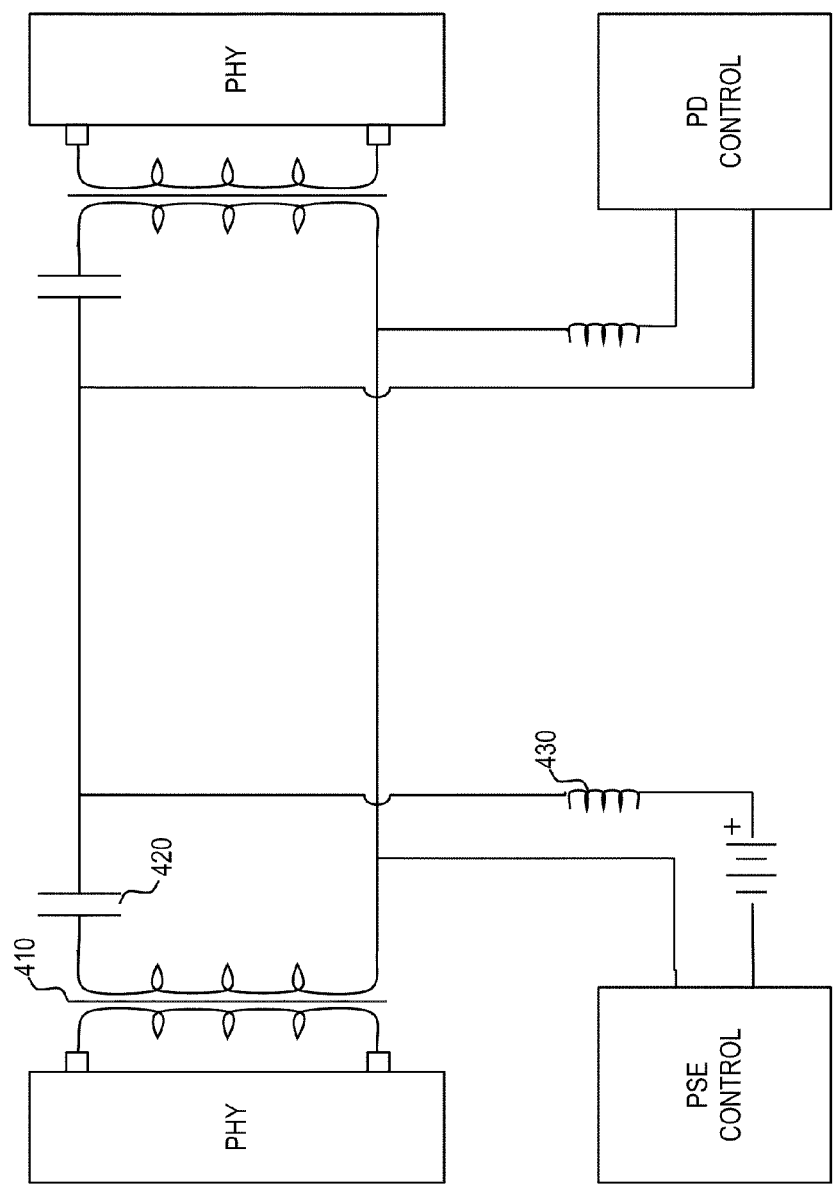
FIG. 4 illustrates an example of coupling to a single pair using one direct current blocking element and one alternating current blocking element.

It should be noted that while the illustration of FIG. 3 shows data transformers that are coupled to a single pair using a pair of DC blocking elements, only one DC blocking element for each data transformer would be needed. Specifically, a data transformer would be coupled on one end to a first wire conductor via a DC blocking element, while the other end of the data transformer would be coupled to a second wire conductor without a DC blocking element. FIG. 4 illustrates such a configuration. For example, single DC blocking element 420 would be sufficient to prevent DC current from saturating the core of data transformer 410.

Similarly, while the illustration of FIG. 3 shows PSE control 330 and PD control 340 coupled to a single pair using a pair of AC blocking elements, only one AC blocking element would be needed. The other wire connection need not require an AC blocking element. FIG. 4 also illustrates such a configuration. For example, single AC blocking element 430 would be sufficient to prevent AC current from reaching the PSE control.

As has been described, the principles of the present invention enable the use of conventional data transformers in single-pair power applications such as PoE, PoE Plus, legacy powering systems, etc. More generally, the principles of the present invention can be used in a multi-pair application as well.

Figure 5:
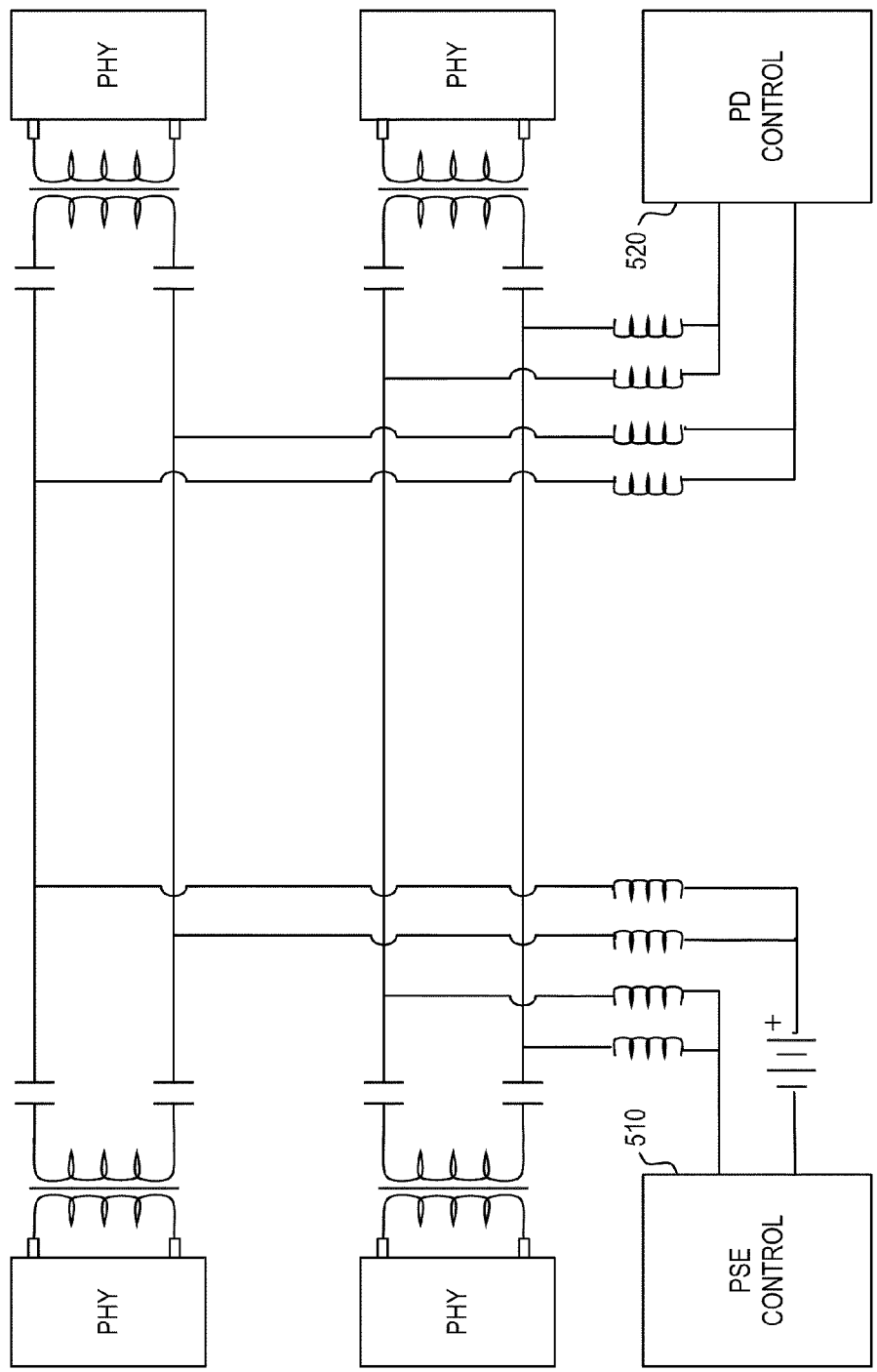
FIG. 5 illustrates an example of a two-pair PoE system according to the present invention.

FIG. 5 illustrates an embodiment of a configuration applied to a two-pair application. As illustrated, PSE control 510 and PD control 520 are coupled to two wire pairs using two sets of AC blocking elements. In the same way as the one-pair application, power can be applied to the two wire pairs after the DC blocking elements on the PSE and PD side.

The principles of the present invention enable power to be applied to single pairs or multiple pairs. As would be appreciated, the single-pair interface can be provisioned along with other single-pair interfaces for a single device. In one example, the multiple single pair interfaces an be used to carry power from the same or different PSEs as part of a redundancy scheme. Control of such provisioning can be implemented using various Layer one or Layer two communication techniques.

It should be noted that in one embodiment, the principles of the present invention can be applied to single-pair applications without a data transformer, wherein the data transformer is emulated using integrated circuits.

As would be appreciated, the principles of the present invention can be applied to all types of twisted pair cabling, including Category 2, 3, 5, 6, 7, etc. The principles of the present invention can also be applied to a two-conductor cable such as RG6 coaxial cabling. In general, the principles of the present invention can be used in any system that implements power and/or high-speed communication over a single-pair data interface. This is true of standard Ethernet connections or for Broad Reach connections that span greater than 100 meters. It should also be noted that as the DC blocking elements do not impact the high-speed communication, the DC blocking elements can be applied to the data interface in enabling future applications of power delivery over the data interface.

In the above description, reference was made to the 802.3af and 802.3at specifications, which are amendments to the IEEE standard. As would be appreciated, the principles of the present invention would also be applicable to the underlying IEEE standard that incorporates such amendments as well as to future amendments to the IEEE standard.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system that enables power delivery over a single twisted wire pair to a powered device, comprising:
   a data transformer having a first end and a second end;
   a first direct current blocking element having a first side coupled to a first end of said transformer, and a second side coupled to a first wire of the single twisted wire pair;
   a second direct current blocking element having a first side coupled to a second end of said transformer, and a second side coupled to a second wire of the single twisted wire pair;
   a first alternating current blocking element having a first side coupled to said second side of said first direct current blocking element, and a second side coupled to a power sourcing equipment; and
   a second alternating current blocking element having a first side coupled to said second side of said second direct current blocking element, and a second side coupled to said power sourcing equipment,
   wherein said power sourcing equipment provides power to the powered device through the single twisted wire pair via said first and second first alternating current blocking elements.

2. The system of claim 1, wherein said first and second direct current blocking elements are capacitors.

3. The system of claim 1, wherein said first and said first alternating current blocking elements are inductors.

4. A powered device system that receives power from a power sourcing equipment over a single twisted wire pair, comprising:
   at least one direct current blocking element that couples a data transformer to the single twisted wire pair;
   a powered device controller; and
   at least one alternating current blocking element that couples said powered device controller to the single twisted wire pair for receipt of power from the power sourcing equipment.

5. The system of claim 4, wherein said direct current blocking element is a capacitor.

6. The system of claim 4, wherein said alternating current blocking element is an inductor.

7. The system of claim 4, wherein said at least one direct current blocking element is two direct current blocking elements.

8. The system of claim 4, wherein said at least one alternating current blocking element is two alternating current blocking elements.

9. A power sourcing equipment system that deliver power over a single twisted wire pair to a powered device, comprising:
   at least one direct current blocking element that couples a data transformer to the single twisted wire pair;
   a power sourcing equipment; and
   at least one alternating current blocking element that couples said power sourcing equipment to the single twisted wire pair for delivery of power to the powered device.

10. The system of claim 9, wherein said direct current blocking element is a capacitor.

11. The system of claim 9, wherein said alternating current blocking element is an inductor.

12. The system of claim 9, wherein said at least one direct current blocking element is two direct current blocking elements.

13. The system of claim 9, wherein said at least one alternating current blocking element is two alternating current blocking elements.

14. A system that enables power delivery over a single coaxial cable to a powered device, comprising:
   a data transformer having a first end and a second end;
   a first direct current blocking element having a first side coupled to a first end of said transformer, and a second side coupled to a first conductor of the single coaxial cable;
   a second direct current blocking element having a first side coupled to a second end of said transformer, and a second side coupled to a second conductor of the single coaxial cable;
   a first alternating current blocking element having a first side coupled to said second side of said first direct current blocking element, and a second side coupled to a power sourcing equipment; and
   a second alternating current blocking element having a first side coupled to said second side of said second direct current blocking element, and a second side coupled to said power sourcing equipment,
   wherein said power sourcing equipment provides power to the powered device through the single coaxial cable via said first and second first alternating current blocking elements.

15. A powered device system that receives power from a power sourcing equipment over a single coaxial cable, comprising:
   at least one direct current blocking element that couples a data transformer to the single coaxial cable;
   a powered device controller; and
   at least one alternating current blocking element that couples said powered device controller to the single coaxial cable for receipt of power from the power sourcing equipment.

16. A power sourcing equipment system that deliver power over a single coaxial cable to a powered device, comprising:
   at least one direct current blocking element that couples a data transformer to the single coaxial cable;
   a power sourcing equipment; and
   at least one alternating current blocking element that couples said power sourcing equipment to the single coaxial cable for delivery of power to the powered device.

* * * * *